Figure 1:
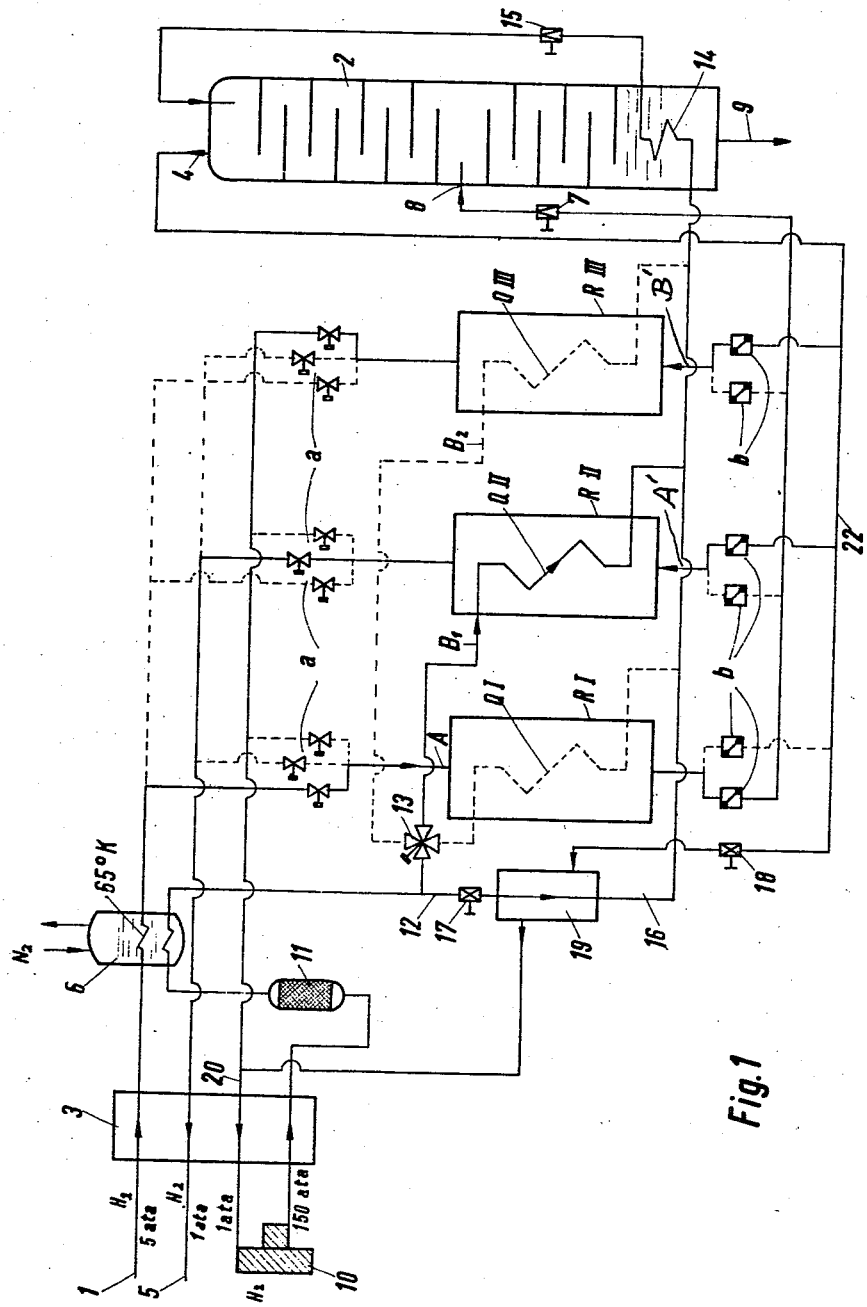

United States Patent Office 3,105,360
Patented Oct. 1, 1963

3,105,360
PROCESS AND APPARATUS FOR THE CONTINUOUS PURIFICATION OF GASES IN RESERVOIR HEAT EXCHANGERS
Wilhelm Lehmer, Munich, and Rudolf Becker, Munich-Solln, Germany, assignors to Gesellschaft für Linde's Eismaschinen Aktiengesellschaft, Hollriegelskreuth, near Munich, Germany, a German company
Filed Dec. 8, 1958, Ser. No. 778,963
Claims priority, application Germany Dec. 11, 1957
11 Claims. (Cl. 62—13)

This invention concerns a process and an apparatus for the continuous purification of gases in heat exchangers through freezing out and revaporizing admixtures to be eliminated under operating conditions which make the revaporization into the purge gas difficult, and at the same time under the most energy-conserving conditions possible, whereby a pure gas quantity is available as rinsing gas for the eliminated admixtures.

Freezing out, and in particular the condensation of higher boiling components of a gas mixture with simultaneous heat exchange, particularly in reversible heat reservoir apparatus (regenerators) or alternating counterflow apparatus (reversing exchangers), is known as an economical measure in the continuous purification of gases. For the problem of eliminating admixtures which have an anomalous solubility, particularly an anomalously high solubility in the carrier gas—for example, $CO_2$ in highly compressed air at low temperatures—there are also various solutions known. Thus it is known that in the separation of air into its components with the assistance of cold reservoirs for the heat exchange between the air and the separation products, the sublimation of the solid carbon dioxide deposited (from the air) in the cold reservoirs is facilitated by allowing a quantity of separated components, which is greater than that of the entering air to be separated, to flow through the cold reservoir, namely over its entire length or only over its colder part, in which the deposition of the carbon dioxide takes place. This known procedure, however, is not applicable when sufficient purge gas is not available, which is the case for example when hydrogen is to be freed from its contaminations such as nitrogen, carbon monoxide, oxygen etc. before liquefaction. In this case the separation product, namely the purified hydrogen itself, must also be used as purge gas, if one does not wish to work with still lower boiling gases, for example helium, and thereby materially add to the costs of the procedure.

The solution of the problem is actually simplified in presuming that a pure gas stream, which may not be contaminated is also available with its heat or cold content for the heat exchange. This is the case especially in an installation for hydrogen liquefaction, and preferably in such an installation by means of which an enrichment of the deuterium is carried out finally for the production of heavy hydrogen.

It has become known to carry out the elimination of contaminations with anomalous solution conditions in replaceable reservoir heat exchangers in such a way that the contaminated gas is cooled in heat exchange with a cold gas whilst the contaminations are deposited, whereupon these contaminations are absorbed in a reversed stream of cold purge gas, which gas is in counter-flow and heat exchange with a second gas to be cooled, and care is taken that the average regenerating temperature exceeds the average charging temperature. In this, the temperature difference is achieved in that while at least one pair of gases in heat exchange with each other is led through, the ratio of the quantities of these gases is varied. This procedure has the drawback that in using generators, at least four regenerators are needed. Moreover, both of the gas streams to be cooled must be switched to a cross-section which previously had a gas streaming through it at a lower pressure; this causes particularly high switching losses and is structurally expensive when at least one gas is under comparatively high pressure.

The invention described in the following requires the use of only three regenerators and a low switching expenditure.

According to the invention the procedure and equipment for the continuous purification of gases in reservoir heat exchangers (regenerators) by freezing out and revaporizing eliminated admixtures under operating conditions which make the revaporization into the purge gas difficult, particularly with anomalous solubility of the admixtures to be eliminated, for example as a preliminary stage for a hydrogen rectifying installation, avoiding the disadvantages listed in the preceding, characterized in that in a first cold period, the revaporization into the purge gas stream, preferably the return stream of the processed crude gas, is supported by means of an auxiliary gas stream to be cooled and led in parallel stream with the crude gas stream through a separate cross-section along at least a part of the regenerator, and in at least one second cold period the heat balance disturbance caused by the auxiliary gas stream is balanced by means of an additional auxiliary stream to be heated (heat balance stream), preferably by means of the same type of gas as the crude gas. If one proceeds in the gas purification by the rule cited in the preceding according to the invention, then one can work with brief reversal periods of the regenerators, whose periods generally lie below one hour, mostly considerably so, and amount for example from about 2 to about 10 or even 20 minutes.

The invention is of special importance in hydrogen rectification for the production of deuterium. Here the arrangement according to the invention takes over an important procedural step for the cooling and purification of the hydrogen before its liquefaction. The most favorable cold utilization is particularly important here, since the profitability of the heavy hydrogen producing procedure is dependent on it; moreover the mentioned additional pure gas stream (heat balance stream) is already procedurally provided in sufficient quantity and its use does not involve an additional expenditure.

According to a further development of the inventive idea, at least one auxiliary gas stream belongs to a cycle, which preferably forms the cold economy and/or a required rectifying column reflux. Furthermore, it is expedient to insert an absorber arrangement—preferably a regeneratable adsorber—into the purge gas stream or cycle.

According to a further development of the inventive idea, it is provided that in working with three periods, the two heat streams provided in the cold periods are connected in parallel and, if necessary, connected in series together with the heat balance stream, whereby if necessary a bypass line is provided for the regulation of the two parallel streams. Under some circumstances it is expedient to insert, in addition, at least two periods, particularly a vacuum rinsing period between two cold periods.

The procedure according to the invention can find use in any separation and any evaporation. It can be used successfully also when situations other than the anomalous solubility mentioned in the introduction—for example, too high pressure, too low temperature of the rinsing gas, too small quantities—would not permit a sufficient regeneration of a heat exchanger or purifier with previously known arrangements.

Under some circumstances the procedure according to the invention can also be combined with other, possibly known, procedures such as vacuum purge periods, or be supplemented by the same. Modifications from the above-mentioned modes of execution are also possible; for example, in that the heat balance stream, for example pure hydrogen, may also act as a purge gas which takes up eliminations. This is also possible when the purge gas forms a cycle, for example in a hydrogen-deuterium installation, and is purified by adsorption. Precisely in this case a considerable advantage results, because the hydrogen being used there as cyclic hydrogen can be cleaned more economically at higher temperatures by adsorption than can a feed hydrogen, in which a higher conversion rate of the ortho-para-hydrogen conversion—and thus a greater cold loss—is to be expected than in the adsorptive purification of the hydrogen cycle quantity.

Figure 2:
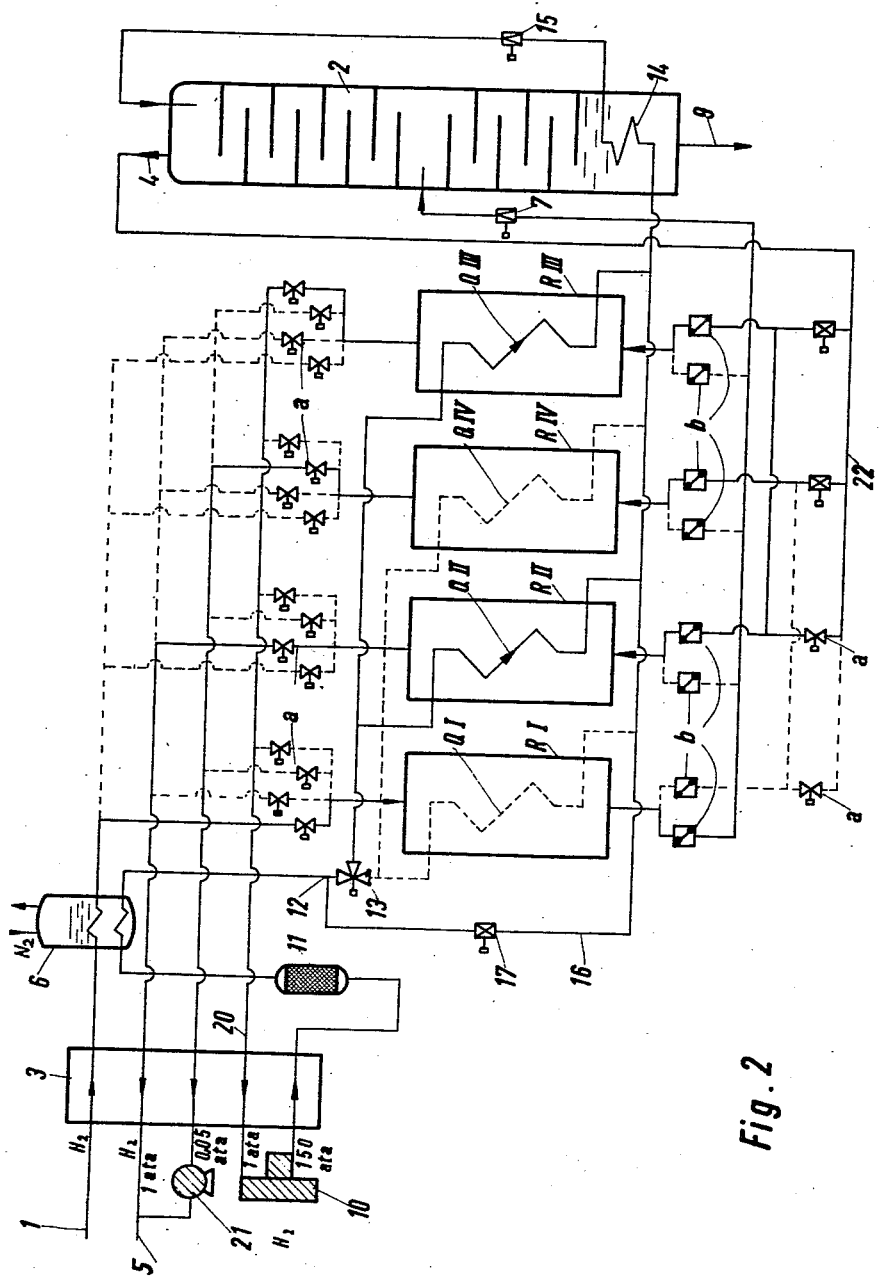

In the drawing:

FIGURE 1 schematically represents an illustrative embodiment of apparatus according to the invention by way of example; and FIGURE 2 schematically represents a slightly modified form of the apparatus shown in FIG. 1 involving the use of a fourth regenerator.

The inventive idea is to be explained in its fundamental outlines first with reference to FIGURE 1. In this figure "$R_I$," "$R_{II}$," "$R_{III}$" designate three regenerators, which are used in triple-cycle alternation with each other. The arrows indicate the gas flow directions. The regenerators are provided, in a manner known per se, with one special transverse section each, for example in the form of a coil of pipe "$Q_I$," "$Q_{II}$" and "$Q_{III}$," through which gas can be sent at will, which effects a desired heating or cooling of a gas flowing through the regenerator and in direct heat exchange with it.

The valves are represented by the usual symbols; in particular, "$a$" means pilot valve and "$b$" means back-pressure valves.

In flow directions of the gases which enter into consideration in each case in the period represented are indicated by arrows, while those conduits in which there is no flow present during this period are represented in dashed lines.

The operation of the regenerators according to one example of execution shapes up as follows:

Crude gas ("Feed $H_2$") streams into the installations at 1 in the form of pre-purified and pre-cooled hydrogen, which finally is to be separated in the rectifying column 2 into (a) a fraction enriched in deuterium and (b) another fraction containing little or no deuterium. The feed hydrogen flows first through a heat exchanger 3, in which it is in countercurrent and heat exchange relationship with processed hydrogen exiting at 4 from the rectifying column 2 and flowing out of the installation at 5. The hydrogen flowing in at 1 comes from an available industrial installation and is at a pressure of about 5 atmospheres, while the processed hydrogen flowing off at 5 is at a pressure of about 1 atmosphere. The feed hydrogen, after leaving the heat exchanger 3, is further cooled to 65° K. in a nitrogen vaporizer 6, and then streams through the regenerator "$R_I$" and is finally expanded—through an expansion valve 7—at intermediate inlet 8 into the rectifying column 2. The product obtained in the rectifying column 2—i.e., the deuterium—is withdrawn from the foot of the column at 9.

According to the example of execution, it is presumed that the two auxiliary gas streams—that is, the purge gas stream as well as the heat balance stream—are branched off from a common gas stream consisting of pure hydrogen; and, that this pure hydrogen stream moreover forms a cycle which is closed by the rectifying column reflux within the column 2. This cycle consists of a high pressure portion of pure hydrogen compressed in the compressor 10 to about 150 atmospheres, which is freed by an adsorber 11 of the contaminations which it has taken up possibly as purge gas stream in the regenerators and from other sources of the installation. From there (i.e., from absorber 11) it flows through the nitrogen vaporizer 6, in which latter it is cooled to 65° K., and is branched into two partial streams at 12. The one partial stream is distributed by the pilot and distributing valve 13 to the special transverse sections "$Q_{I-III}$" of the regenerators and—in the period represented in the drawing—flows through the regenerator "$R_{II}$" as a high pressure stream, from there arriving in the heating coil 14, located in the sump of column 2, and subsequently is expanded through the expansion valve 15 into the head of the column 2. The other partial stream, after passing through a regulating valve 17, is combined with another partial stream coming from the regenerator "$R_{II}$" in the bypass line 16 and flows further into the heating coil 14. The bypass line 16 with the regulating valve 17 serves to determine the partial heating streams passing through the regenerators.

The described high pressure part of the hydrogen cycle is supplemented by the low pressure hydrogen stream leaving the head of the column 2 at 4 by way of conduit 22, which low pressure part streams through a regulating valve 18 and a heat exchanger 19 to the conduit 20, through which latter conduit the low pressure hydrogen—which has about 1 atmosphere pressure—moves towards the suction side of the compressor 10, thereby passing through the heat exchanger 3. Two partial streams are branched off from the line 22, and are led (1) as purge gas through the regenerator "$R_{II}$" and (2) as heat balance stream through the regenerator "$R_{III}$."

The functions of the individual partial streams are as follows in the represented regenerating period:

The regenerator "$R_I$" is in the heating period, while the two regenerators "$R_{II}$" and "$R_{III}$" are operated in cold period. Crude gas A—according to the example, hydrogen—is sent by the regenerator "$R_I$" in the direction of the arrow through the regenerator. The transverse section "$Q_I$" is not used in this period according to the example of execution, and is therefore represented in dashed lines. The rinsing gas stream A' that is to be heated—which may be purified hydrogen—is led by the regenerator "$R_{II}$" in the direction of the arrows through the regenerator "$R_{II}$" in the direction of the arrows through the regenerator. Simultaneously the gas stream $B_1$, which is to be cooled, in particular a compressed gas stream for also heating the purge gas stream A', streams according to the invention through the transverse section "$Q_{II}$" in the direction of the arrow. In the third period, III—the second cold period—a pure gas stream B' (as heat balance stream), passes through the regenerator "$R_{III}$," which stream B' according to the example of execution consists of the same gas as the auxiliary gas stream $B_1$ (in the period II, and forms with stream $B_1$) an at least partially common stream. The transverse section "$Q_{III}$," drawn with dashes, is not used at this stage, but if necessary an additional auxiliary gas stream $B_2$ that is to be heated can be passed through it. The quantities of gas which pass through "$Q_{II}$" and if necessary through "$Q_{III}$" can be adjusted by means of bypass line 16 which is provided with a regulating valve 17. Depending on the quantity of circulating hydrogen, a heat exchanger 19 is to be provided in the line 16.

The effect of the individual processes in periods I to III is as follows:

In period I the gas stream A is cooled from its temperature "TWA" to the temperature "TKA" by the cold filling of the regenerator "$R_I$"; in this the undesirable components of the gas mixture are frozen out and the filling in the regenerator "$R_I$" is heated. In this, "TW" generally designates the temeprature at the warm end, while "TK" means the temperature at the cold end; the warm end is located at the upper and the cold at the lower end of the regenerators represented in the drawing. The expression "TWA" means "temperature of the warm gas, flow A, while the expression "TKA" mean "temperature of the cold (kalt) gas, flow A.

In period II the temperature of the purge gas stream A' rising from TKA' to TWA' is elevated at the critical places of deposition by heat-exchange with $B_1$ compared to heat exchange with the filling mass alone, whereby also $TKB^1$ has to be higher than TKA. The take-up capacity for the depositions is increased thereby and the vaporization desired for the continuous purification, even under the more difficult conditions such as exist with anomalous solubility, is achieved. The rinsing is concluded with period II, and the regenerator mass is pre-cooled. II accordingly represents the rinsing and first cold period.

In period III the heat balance is balanced again by the pure cold gas B' and if necessary at the same time by a hot balancing stream $B_2$, while the reservoir mass in the regenerator "$R_{III}$" is cooled off (second cold period).

In FIGURE 2 there is represented a modification of the example of execution according to FIGURE 1; the important parts of the installation are the same and the reference symbols have likewise been retained.

The difference consists in that according to FIGURE 2 there is provided a fourth regenerator "$R_{IV}$" which is operated as a vacuum period between the two cold periods II and III, and in which there takes place an additional discharging of deposited solid components by a rinsing effected by means of a purge gas under reduced pressure. As purge gas there is used pure hydrogen, which is branched off in small amounts behind 4 from the line 22 by one of the regulating valves in each case, which hydrogen is drawn through the main transverse section of the regenerator "$R_{IV}$" by means of the suction pump 21 and forced at 5 into the discharge line for the processed hydrogen. In addition it is provided, according to the apparatus arrangement illustrated in FIGURE 2, that the transverse section "$Q_{III}$" has heating stream flowing through it parallel to the transverse section "$Q_{II}$."

We claim:

1. In a process for the continuous purification of a crude gas by freezing out and revaporizing admixtures to be separated into a purge gas under anomalous solubility conditions in a regenerator system comprising a plurality of regenerators cyclically variable between regenerative periods each regenerator having a heat storage mass and a first fluid passage and a different second fluid passage therethrough, the method which comprises passing the crude gas through the first fluid passage of a first regenerator in the direction from the warm end to the cold end thereof, thereby condensing the admixtures, simultaneously passing a purge gas through the first fluid passage of a second regenerator in the opposite direction, thereby revaporizing admixtures condensed there in a preceding regenerative period, simultaneously passing a first auxiliary warm gas stream through the second fluid passage of said second regenerator in the direction from the warm end to the cold end thereof, and in the same regenerative period passing a cold second auxiliary gas stream through the first fluid passage of a third regenerator in the direction from the cold end to the warm end thereof, thereby withdrawing heat provided by the first auxiliary warm gas stream flowing through its second fluid passage in such preceding regenerative period.

2. Process according to claim 1, in which the crude gas is hydrogen with admixtures of nitrogen, carbon dioxide and oxygen.

3. Process as defined in claim 1, in which said first auxiliary gas stream is part of a cycle which comprises withdrawing a gas from a rectifying device, warming it, compressing it, cooling it by passing it through the second fluid passage of said second regenerator in the direction from the warm end to the cold end thereof in the regenerative period during which said purge gas is flowing through the first fluid passage of said one regenerator in the opposite direction, condensing said cooled first auxiliary gas stream in heat-exchange with boiling sump liquid of the rectifying device and, after pressure reduction, passing it into the rectifying device thereby providing reflux.

4. Process as defined in claim 3, in which the first auxiliary warm gas stream is cleaned by adsorption after compressing.

5. Process as defined in claim 3, wherein at least part of said gas withdrawn from the head of said rectifying device is passed through the first fluid passage of said third regenerator from the cold end to the warm end to be warmed thereof thereby serving as said cold second auxiliary gas stream.

6. In a process according to claim 1, the method which comprises feeding the gas purified by passing said crude gas through the first fluid passage of said first regenerator in the direction from the warm end to the cold end thereof, thereby condensing the admixtures, into a rectifying column at a point between the head and the foot of said column; withdrawing a gaseous product from the head of said column and passing a first part of said withdrawn gaseous product as said purge gas through the first fluid passage of said second regenerator in the direction from the cold end to the warm end thereof, thereby revaporizing the admixtures of said crude gas condensed there, in the preceding regenerative period, passing a second part of said withdrawn gaseous product as said cold second auxiliary gas stream through the first fluid passage of said third regenerator in the direction from the cold end to the warm end thereof, thereby withdrawing heat provided by the first auxiliary warm gas stream flowing through its second fluid passage during the preceding regenerative period, and passing a third part of said withdrawn gaseous product by way of a heat economy-control-by-pass valve through a heat-exchanger in direction from the cold end to the warm end to warm the third part, joining said second part and said third part of said withdrawn gaseous product and compressing said jointed latter parts in a compressor, cleaning the compressed gas by adsorption and passing at least part of it as said first auxiliary warm gas stream through the second fluid passage of said second regenerator in the direction from the warm end to the cold end thereof and another part of it by way of a heat economy-control-by-pass valve through said heat-exchanger in opposite direction of said gas not yet compressed; jointly condensing said first auxiliary warm gas stream having passed the second fluid passage of said second regenerator and said other part of compressed and cleaned gas having passed said heat exchanger by vaporizing a sump liquid of said rectifying device; expanding the condensed gas and feeding it in the top of said rectifying device and using it to provide the reflux in said column.

7. In a process for the continuous purification of a crude gas by freezing out and revaporizing admixtures to be separated into a purge gas under anomalous solubility conditions in a regenerator system comprising a plurality of regenerators cyclically variable between regenerative periods each regenerator having a first fluid passage and a different second fluid passage therethrough, the method which comprises passing the crude gas through the first fluid passage of a first regenerator in the direction from the warm end to the cold end thereof, thereby condensing the admixtures, passing a purge gas through the first fluid passage of a second regenerator in the opposite direction, thereby revaporizing admixtures condensed there, in the preceding regenerative period; simultaneously passing a first auxiliary warm gas stream through the second fluid passage of said second regenerator in the direction from the warm end to the cold end thereof; in the same regenerative period revaporizing the remainder of the admixtures previously condensed there by evacuating the first fluid passage of a fourth regenerator, while still a small quantity of purge gas may be passed through it, and in the same regenerative period passing a cold second auxiliary gas stream through the first fluid passage of a third regenerator in the direction from the cold end to the warm end thereof, thereby withdrawing heat provided by said first auxiliary warm gas stream, flowing through its second fluid passage during the pre-preceding regenerative period.

8. Process as defined in claim 6, which hcomprises passing another auxiliary warm gas stream through the second fluid passage of said third generator in the direction from the warm end to the cold end thereof whilst simultaneously said cold second auxiliary gas stream is passed through its first fluid passage from the cold end to the warm end thereof.

9. In a process according to claim 7, the method which comprises feeding the gas purified by passing the crude gas through the first fluid passage of said first regenerator in the direction from the warm end to the cold end thereof, thereby condensing the admixtures, into a rectifying column at a point between the head and the foot of said column, withdrawing a gaseous product from the head of said column and passing part of said withdrawn gaseous product as said purge gas through the first fluid passage of said second regenerator in the direction from the cold end to the warm end thereof, thereby revaporizing the admixtures of said crude gas condensed there in the preceding regenerative period, in the same regenerative period passing another small part of said withdrawn gaseous product as a purge gas through the first fluid passage of said fourth regenerator in the direction from the cold end to the warm end thereof whilst simultaneously evacuating said regenerator, and in the same period passing the remainder of said withdrawn gaseous product as said cold second auxiliary gas stream through the first passage of said third regenerator in the direction from the cold end to the warm end thereof, thereby withdrawing heat provided by the first auxiliary warm gas stream flowing through its second fluid passage during the pre-preceding regenerative period; compressing the gas coming in the same regenerative period from said third regenerator, cleaning the compressed gas by adsorption and passing part of said compressed gas as said first auxiliary warm gas stream through the second fluid passage of said second regenerator in the direction from the warm end to the cold end thereof, passing another part of said compressed gas as another auxiliary warm gas stream through the second fluid passage of said third regenerator in the direction from the warm end to the cold end thereof, and passing another part of said compressed gas through a heat economy-control-by-pass valve, jointly condensing said first auxiliary warm gas stream having passed the second fluid passage of said second regenerator and said other auxiliary warm gas stream having passed the second fluid passage of said third regenerator and said other part of compressed gas having passed over the heat economy-control-by-pass valve by vaporizing a sump liquid of the rectifying device; expanding the condensed gas and feeding it in the top of the rectifying device and using it to provide the reflux in said column.

10. Apparatus for the continuous purification of crude gases by freezing out and revaporizing admixtures to be separated into a purge gas under anomalous solubility conditions comprising a set of at least three regenerators each having a chamber therein with a warm terminal connection, an inlet for crude gas, and an outlet for a gaseous product, a cold terminal connection, an inlet for a cold gaseous product, and an outlet for cooled and pre-purified gas; a coil in said chamber with an inlet for a compressed cycle gas at the warm end and an outlet for said gas at the cold end of said regenerator; a compressor having an input connection and an output connection; an adsorber having an input connection and an output connection; a heat-exchanger having first inlet and outlet terminals and second inlet and outlet terminals; a rectifying column having a heating coil in the sump thereof, an inlet and an outlet at the upper end thereof, another inlet at an intermediate part thereof and a product-outlet at the sump thereof; low-pressure valve-controlled conduit means connecting the outlet at the top of said rectifying column to the cold terminal connections of said regenerators and also to the first input terminal of said heat-exchanger; valve-controlled conduit means connecting the cold terminal connections of said regenerators to the intermediate inlet of said rectifying column; valve-controlled conduit means connecting the warm ends of said regenerators and the first outlet terminal of said heat exchanger to said input terminal of said compressor; high-pressure conduit means connecting the outlet of said compressor to the inlet of said adsorber and connecting the outlet of said adsorber to both the second inlet of said heat exchanger over a heat economy-control-by-pass valve and also through distributing valve means to the coils of said regenerators; and conduit means connecting the second outlet of said heat exchanger and the outlets of the regenerator coils through the heating coil in said rectifying column and an expansion device to the inlet at the top of said rectifying column.

11. Apparatus for the continuous purification of crude gases by freezing out and revaporizing admixtures to be separated into a purge gas under anomalous solubility conditions comprising a set of four regenerators each having a chamber therein with a warm terminal connection, an inlet for crude gas and an outlet for a gaseous product, a cold terminal connection, an inlet for a cold gaseous product and an outlet for cooled and prepurified gas; a coil in said chamber with an inlet for a compressed cycle-gas at the warm end and an outlet for said gas at the cold end of said regenerator; a compressor having an input connection and an output connection; an adsorber having an input connection and an output connection; a rectifying column having a heating coil in the sump thereof, an inlet and an outlet at the upper end thereof, another inlet at an intermediate part thereof and a product outlet at the sump thereof; low-pressure valve-controlled conduit means connecting the outlet at the top of said rectifying column to the cold terminal connections of said regenerators; valve-controlled conduit means connecting the cold terminal connections of said regenerators to the intermediate inlet of said rectifying column; valve-controlled conduit means connecting the warm ends of said regenerators to said input terminal of said compressor; high-pressure conduit means connecting the outlet of said compressor to the inlet of said adsorber and connecting the outlet of said adsorber to both a heat economy-control-by-pass valve and also through distributing valve means to the coils of said regenerators; and conduit means connecting said by-pass-valve and the outlets of the regenerator coils through the heating coil in said rectifying column and an expansion device to the inlet at the top of said rectifying column.

References Cited in the file of this patent

UNITED STATES PATENTS

| | | |
|---|---|---|
| 2,534,478 | Roberts | Dec. 19, 1950 |
| 2,619,813 | Schuftan | Dec. 2, 1952 |
| 2,663,167 | Collins | Dec. 22, 1953 |
| 2,671,324 | Trumpler | Mar. 9, 1954 |
| 2,715,820 | Becker | Aug. 23, 1955 |
| 2,737,784 | Becker | Mar. 13, 1956 |

FOREIGN PATENTS

| | | |
|---|---|---|
| 725,157 | Germany | Sept. 16, 1942 |
| 935,195 | Germany | Nov. 17, 1955 |
| 1,137,819 | France | Jan. 21, 1957 |